A. KINGSBURY.
DYNAMO ELECTRIC MACHINE.
APPLICATION FILED JAN. 11, 1909.
992,965.
Patented May 23, 1911.
3 SHEETS—SHEET 1.
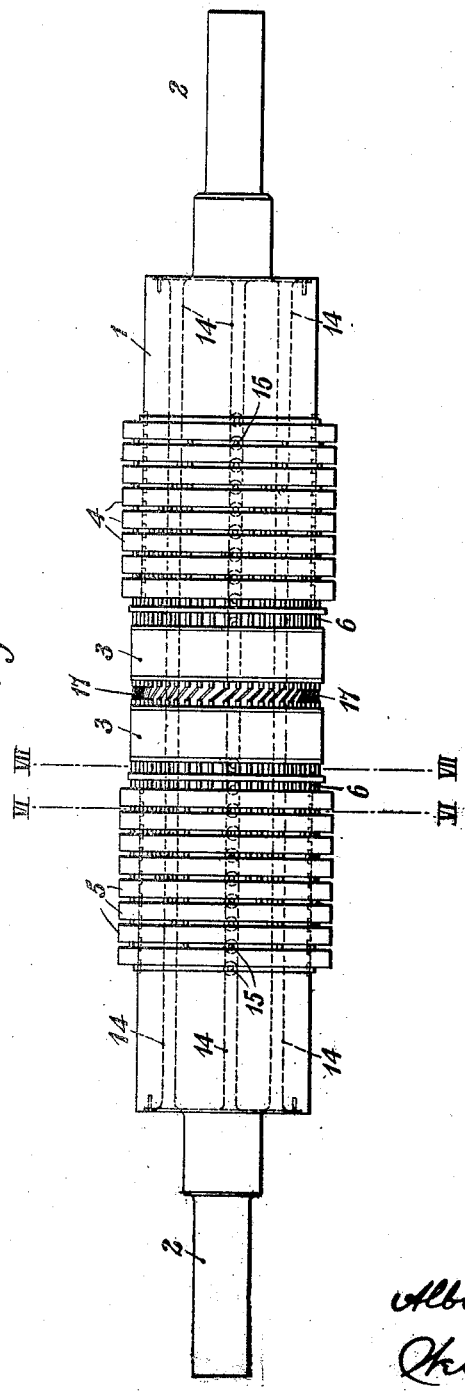

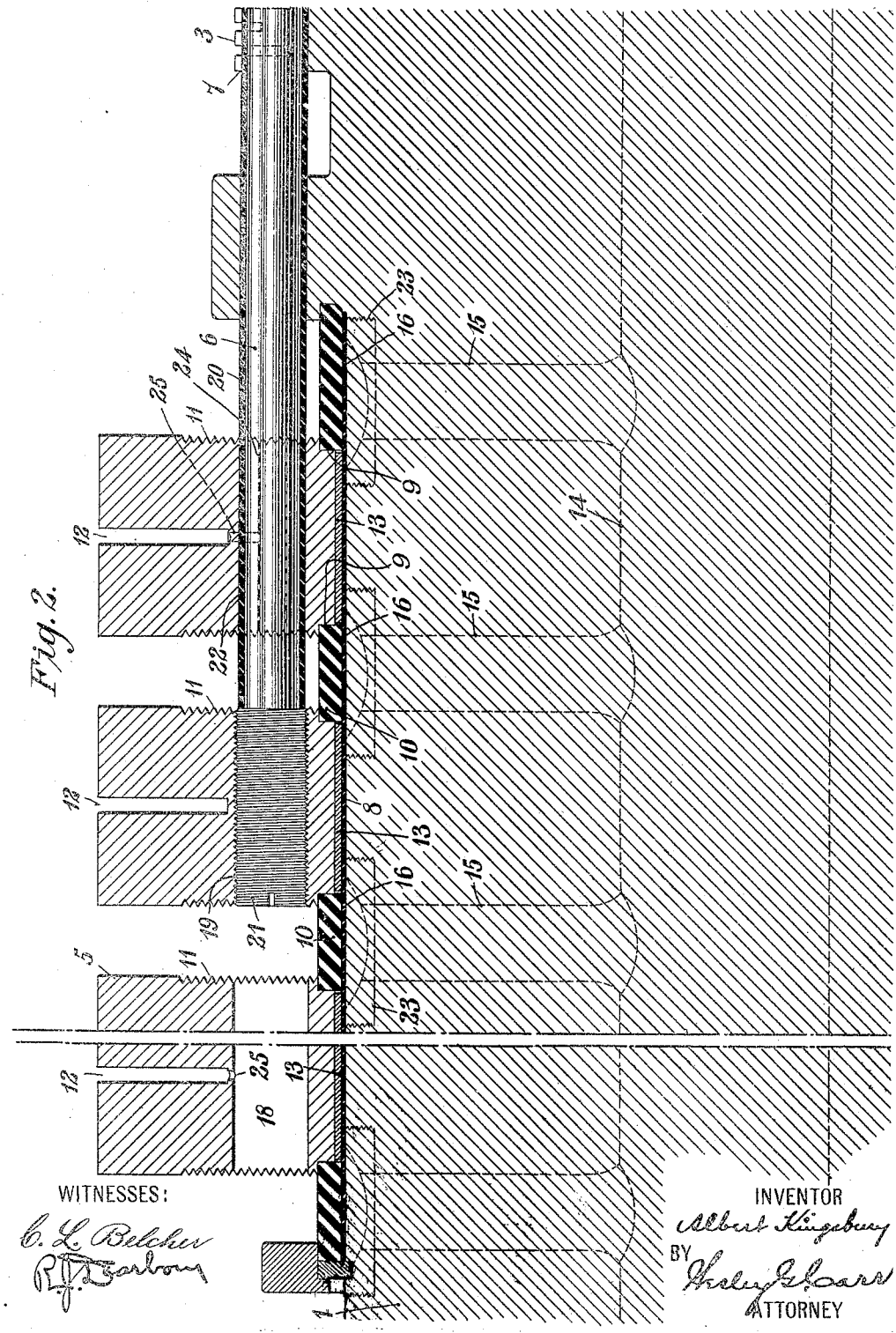

A. KINGSBURY.
DYNAMO ELECTRIC MACHINE.
APPLICATION FILED JAN. 11, 1909.
992,965.
Patented May 23, 1911.
3 SHEETS—SHEET 3.
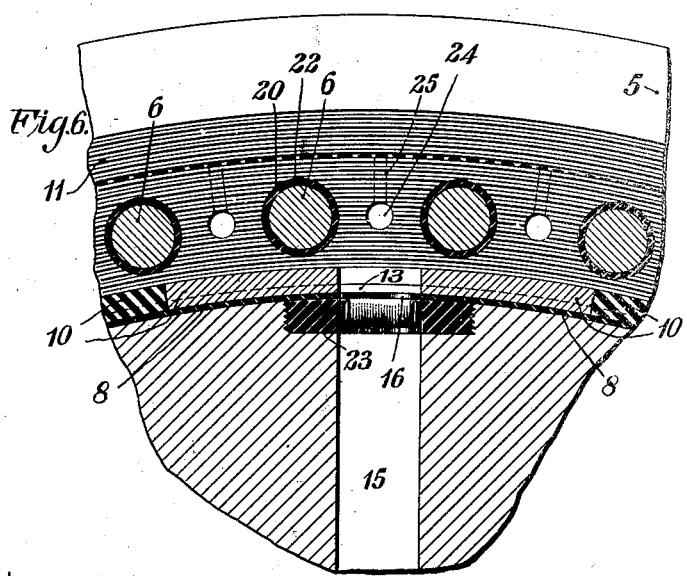
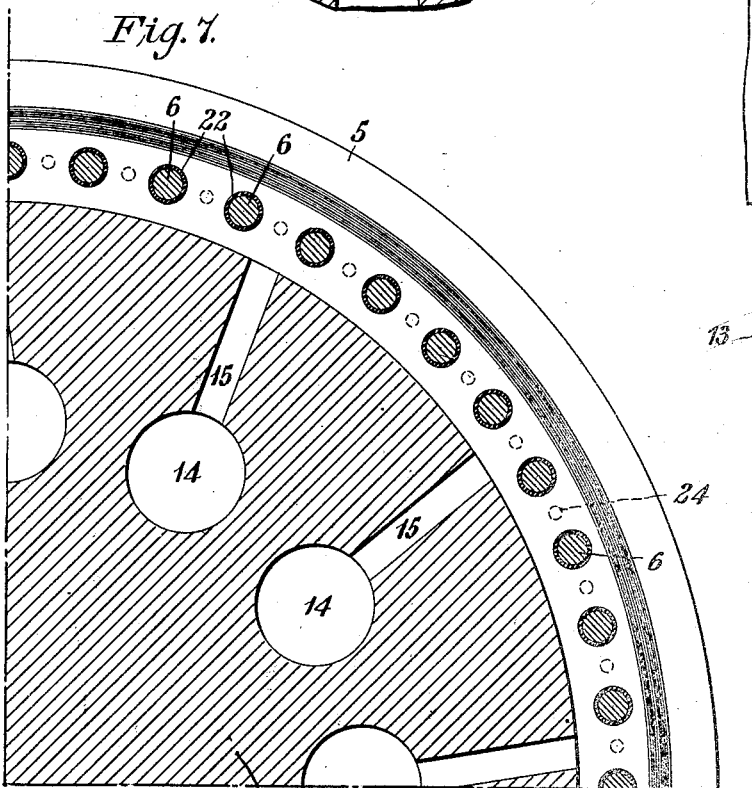
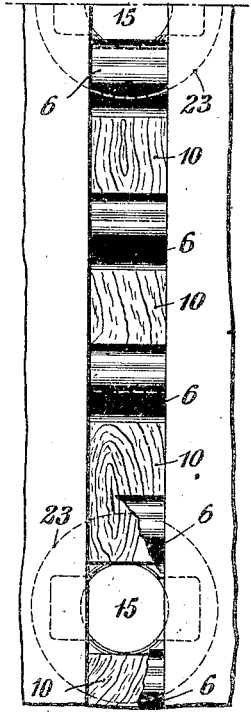
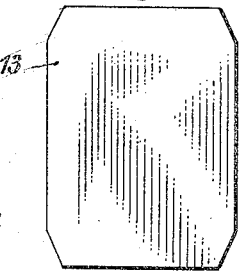
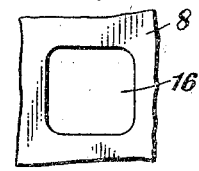
WITNESSES:
C. L. Belcher
R. J. Farbow
INVENTOR
Albert Kingsbury
BY
ATTORNEY

UNITED STATES PATENT OFFICE.

ALBERT KINGSBURY, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

992,965.   Specification of Letters Patent.   Patented May 23, 1911.

Application filed January 11, 1909. Serial No. 471,635.

*To all whom it may concern:*

Be it known that I, ALBERT KINGSBURY, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and it has special reference to the armatures of unipolar machines having a large number of collector rings.

The object of my invention is to provide an armature structure for machines of the class above indicated that shall automatically accommodate itself to the expansion of the collector rings and be relatively simple and durable in construction.

Other advantages pertaining to my armature structure will be hereinafter pointed out.

Armatures pertaining to unipolar machines of large size are usually provided with two sets of collector rings which are separated from the core member by annular projections and are connected by armature conductors of considerable length. It has been my aim to facilitate the assembling of the armature and to improve the behavior of the parts in operation, by providing suitable insulating spaces between the collector rings and to provide automatic means for compensating for the expansion and contraction of the collector rings themselves.

Figure 1 of the accompanying drawings is an elevation of a unipolar armature constructed in accordance with my invention, Fig. 2 is a longitudinal section and Figs. 3, 4 and 5 are detail views, on a larger scale, of portions of the structure shown in Fig. 1. Figs. 6 and 7 are sectional views taken, respectively, on the lines VI—VI and VII—VII of Fig. 1.

Referring to the drawings, the armature here illustrated comprises a magnetizable core member 1 having shaft projections 2 at its ends and annular projections 3 near its middle point, collector rings, which are divided into two sets 4 and 5, and armature conductors 6 which connect corresponding rings of each set and extend through slots 7 in the annular projections 3.

The collector rings 4 and 5 are mounted upon the core member 1, which is first provided with an insulating cylinder or wrapping 8. Each of the rings 4 and 5 is undercut to form annular notches 9 at its inner edges to receive the ends of spacing blocks 10 of wood, or other insulating material, which are disposed between the adjacent collector rings in the form of segmental rings and which space the collector rings apart. Each of the rings 4 and 5 is further provided with annular saw-tooth projections 11 the slots 12 which improve the ventilation of the ring by increasing its radiating surface.

In order to hold the rings 4 and 5 firmly in position, at relatively high speeds and temperatures, when they are materially increased in size by reason of the expansion of the metal, resilient seats are provided which are composed of a plurality of plates 13 (see Fig. 4) which are preferably constructed of spring steel and are so assembled, directly under the rings, as to lie end to end in the form of a segmental ring, the plates being sprung to conform to the curvature of the core member 1 and held in such position by clamping rings (not shown) or by other suitable means, while the rings 4 and 5 are being shrunk into position.

When copper or brass collector rings of large diameter are shrunk upon a cylinder, such as the core member 1, the expansion of the rings will either be sufficient to make them loose on the cylinder or else the elastic limit of the rings will be passed by reason of the high operating speeds of the machine and the expansion of the core member when the temperature of both parts is raised to a relatively high value, such as is reached in the operation of dynamo-electric machines of the character described. By the use of the steel plates 13, the rings are permitted to expand faster than the core member without becoming loose, since the plates tend to straighten themselves and serve as resilient seats for the collectors.

The core member 1 is provided with a plurality of longitudinal holes 14 for purposes of ventilation which communicate with radial passages 15 terminating in the surface of the core member between the collector rings. The segmental rings 10 are interrupted at the mouths of the passages 15 and holes 16 (see Fig. 5) are cut through the insulating cylinder or wrapping 8 so that air may be forced outwardly through the passages between the rings by the centrifugal action exerted when the machine is in operation, cool air being taken in through the holes 14 at the ends of the core member.

Each of the armature conductors 6 is divided into two parts which are offset and are joined together by a flexible connector 17 that lies between the annular projections 3 and the core member. The arrangement of parts is such that the longitudinal holes 18 in the rings and the slots 7 in the projections 3 are in alinement, the offset portions of the armature conductors being respectively located in one of the slots 7 of one projection and in the next adjacent slot in the other projection. The outer ends of the conductors 6, which are cylindrical rods or bars, are somewhat enlarged and are screw-threaded to engage tapped holes 19 in the collector rings to which they are connected. Each rod is insulated from all of the rings except that to which it is connected and is insulated from the core member by means of an insulating tube 20, the outside diameter of which is slightly less than the pitch diameter of the screw-threaded enlargement 21.

While all of the collector rings are provided with the same number of holes, the size of each will depend upon its position relative to the armature conductor which is to be assembled in alinement with it. For example, referring to Fig. 2, the diameter of the hole 18 is of sufficient size to permit enlargement 21 to pass through it, the hole 19 is tapped to fit the enlargement 21 and a corresponding hole 22 in the next adjacent ring is adapted to receive the insulating tube 20 through which the body of the conductor extends.

The mouths of the passages 15 are counter-sunk and are tapped to receive insulating collars 23 for the purpose of increasing the surface leakage distance between the collector rings and the armature core which would otherwise be brought close together adjacent to the holes 16 in the insulating cylinder 8.

The conductors 6 are divided into a plurality of groups, each group comprising as many conductors as there are collector rings in each set, the outer ring of one set being connected to the inner ring of the other set, the next to the outer ring of one being connected to the next to the inner ring of the other set, and so on, corresponding rings of the sets from left to right being connected together in each case.

It will be observed that, by reason of the arrangement just specified, the outer rings of the sets are provided with a great many empty holes through which the conductors are thrust during the assembling process, while all of the holes in the inner rings are occupied. Consequently, the temperature of the inner rings would be largely increased over that of the outer rings except for a plurality of holes 24 which are parallel to the holes 22 and form longitudinal passages to the annular slots 12. The holes 18, in which no conductors are located, communicate with the slots 12 by means of radial holes 25. Since the enlargements 21 are screw-threaded into the holes 19, a good electrical connection is established between the two parts, and, since the armature conductors are divided into two offset parts and are joined by flexible connectors, the rods are free to expand without displacing the collector rings or impairing the electrical connections at their ends.

Since structural modifications may be effected within the spirit and scope of my invention, I desire that only such limitations shall be imposed as are indicated in the appended claims.

I claim as my invention:

1. A rotor for unipolar dynamo-electric machines comprising a magnetizable cylindrical core member, a plurality of collector rings mounted thereon and insulated therefrom, and resilient seats for the rings.

2. A rotor for unipolar dynamo-electric machines comprising a magnetizable cylindrical core member, a plurality of collector rings mounted thereon, and a plurality of plates of resilient material disposed between the core and the rings to form segmental seats.

3. A rotor for unipolar dynamo-electric machines comprising a magnetizable cylindrical core member, a plurality of collector rings mounted thereon, and a plurality of spring steel plates disposed as ring segments between said core and said collector rings.

4. A rotor for unipolar dynamo-electric machines comprising a cylindrical core member having longitudinal holes and substantially radial holes extending from the longitudinal holes to its outer surface, a plurality of collector rings mounted on said outer surface and insulated therefrom, said collector rings being undercut to provide annular shoulders adjacent to the surface of the core member, and segmental spacing rings of insulating material interposed between adjacent collector rings with their edges seated between the collector ring shoulders and the core member.

5. A rotor for unipolar dynamo-electric machines comprising a cylindrical core member having longitudinal holes and substantially radial holes forming passages between the longitudinal holes and its outer surface, a plurality of collector rings mounted on said outer surface and insulated therefrom, said collector rings being undercut to provide annular notches at the surface of the core member, and segmental spacing rings of insulating material interposed between adjacent collector rings and extending under the overhanging portions thereof, the open outer ends of said radial holes being located at the surface of the cylinder between the collector rings and between the segments of the spacing rings.

6. The combination with a relatively large cylindrical member and rings of different material shrunk upon said member, of resilient seats for the rings.

7. The combination with a cylindrical member and a plurality of rings fitted upon said member, of resilient seats for the rings.

8. The combination with a cylindrical support and a metal ring fitted upon said support, of a plurality of plates of resilient material sprung into the form of a segmental ring and interposed between the ring and the support.

9. In a dynamo-electric machine, the combination with a cylindrical support and a plurality of collector rings mounted thereon and insulated therefrom, of resilient seats for the rings and segmental rings of insulating material for spacing the collector rings apart.

10. In a dynamo-electric machine, the combination with a cylindrical support and a plurality of undercut rings mounted thereon and insulated therefrom, of segmental spacing rings of insulating material the edges of which are seated between the overhanging portions of the undercut rings and the cylindrical support.

11. In a dynamo-electric machine, the combination with a cylindrical support, a plurality of undercut collector rings mounted thereon and insulated therefrom, and plates of resilient material sprung into the form of a segmental ring and interposed between the collector rings and the supports, of segmental spacing rings of insulating material held in position by the overhanging portions of the undercut rings.

In testimony whereof, I have hereunto subscribed my name this 21st day of December, 1908.

ALBERT KINGSBURY.

Witnesses:
C. L. DAVIS,
BIRNEY HINES.